United States Patent [19]

Charlebois et al.

[11] Patent Number: 4,490,315
[45] Date of Patent: Dec. 25, 1984

[54] METHODS OF MOULDING OF PLASTICS ARTICLES

[75] Inventors: Leonard J. Charlebois; Fred A. Huszarik, both of Kanata, Canada

[73] Assignee: Northern Telecom Limited, Montreal, Canada

[21] Appl. No.: 547,422

[22] Filed: Oct. 31, 1983

Related U.S. Application Data

[63] Continuation-in-part of Ser. No. 345,774, Feb. 4, 1982, abandoned.

[51] Int. Cl.³ .......................... B29C 6/00; B29F 1/00
[52] U.S. Cl. .................................. 264/40.1; 264/40.2; 264/272.11; 264/328.9; 264/328.12; 425/146; 425/149
[58] Field of Search ................. 264/40.1, 40.2, 272.11, 264/276, 328.12, 328.9; 425/146, 149

[56] References Cited

U.S. PATENT DOCUMENTS

| | | | |
|---|---|---|---|
| 2,332,674 | 10/1943 | Smith | 425/149 |
| 2,474,885 | 7/1949 | Blomquist | 264/169 |
| 3,226,463 | 12/1965 | Wallace | 264/272.14 |
| 3,559,247 | 2/1971 | Larsson | 425/113 |
| 3,840,312 | 10/1974 | Paulson et al. | 425/149 |
| 4,405,083 | 9/1983 | Charlebois et al. | 249/97 |

FOREIGN PATENT DOCUMENTS 1956022  5/1971  Fed. Rep. of Germany ...... 425/146

Primary Examiner—Jay H. Woo
Assistant Examiner—James C. Housel
Attorney, Agent, or Firm—R. J. Austin

[57] ABSTRACT

A method of moulding by low pressure moulding wherein a passage from the mould cavity is bridged by the molten material during filling and in which the moulding pressure is too low to cause the material to flow down the passage. After the mould is completely filled, the pressure increases to cause penetration of the molten material along the passage to a switch operating position to operate a switch to stop further flow of material into the mould.

1 Claim, 9 Drawing Figures

METHODS OF MOULDING OF PLASTICS ARTICLES

This invention relates to moulding of plastics articles and is a continuation-in-part of U.S. patent application Ser. No. 345,774, filed Feb. 4, 1982 in the name of L. J. Charlebois et al and entitled "Moulding of Plastics Articles" and now abandoned.

Various methods of moulding for plastics articles are known. In one well-known method, molten thermoplastics material is injection moulded into a mould cavity for forming shaped articles. The injection moulding procedure operates at substantially high pressures, e.g. above 1500 lbs./sq. in. and possibly as high as 20,000 lbs./sq. in. Because of these pressures, injection moulding procedures require strong mould parts and clamps to hold the mould parts closed. Injection moulding procedures are suitable for the manufacture of certain articles where a high grade surface finish of the articles is of utmost importance. In injection moulding procedures, the pressure at which the molten thermoplastics material is forced into the mould cavities is maintained for several seconds, i.e. until the thermoplastics material located within a gate into the mould solidifies. This solidification holds the molten material within the mould until it has cooled sufficiently to set it permanently into the shape of the moulded articles.

A provision for controlling the termination of an injection stage into the mould includes a switch, which is operated by injection pressure. Such a provision is only operable in the filling of a mould wherein it is possible to predict that the molten material will invariably flow to fill the cavity in a certain way whereby the same part of the cavity is always last to fill. In one high pressure injection moulding process for making records as described in German Offenlegungschrift No. 1,956,022, the inventor overcame a problem in having an excess or shortage in premeasured moulding material by developing a switch which was disposed diametrically opposite to the injection gate into the cavity. As explained in this German specification, the injected material only reaches the location for operation of the switch when the mould cavity is filled and, presumably, because of the disc shaped cavity, such must be the case. Operation of this switch occurs immediately upon the cavity being filled as the highly pressurized molten material moves forward unhesitatingly for switch operation.

In another idea published in U.S. Pat. No. 3,840,312, inventor D. C. Paulson et al on Oct. 8, 1974, a high pressure injection mould has a cylindrical cavity into which molten material is injected axially from a concentrically positioned injection gate. A switch which serves to control the pressure within the cavity is disposed axially at the opposite end from the injection gate and thus is disposed in the region last expected to be filled in the cavity. The switch is part of an expensive and complex control arrangement.

Where it is not desired for the moulded articles to have the same degree of surface finish as is provided by injection moulding techiques, then such articles may be provided by low pressure moulding, i.e. at moulding pressures below those used for injection moulding. Low pressure moulds do not require the same strength and rigidity nor the clamp strength of injection moulds and are less expensive. Thus for certain applications, low pressure moulding procedures have a definite advantage over high pressure moulding. With low pressure moulding methods, however, to prevent the buildup of pressure within the mould after the molten thermoplastic material has filled the mould cavity, it is essential to provide exit ports to the moulds to allow the excess thermoplastics material to flow from the cavity after filling of the cavity. One problem associated with the use of exit ports is that an operator needs to be in continuous attendance during moulding to enable him to switch off the flow of molten thermoplastics material into the cavity. Hence the use of exit ports, even with an operator in attendance, tends to lead to an accumulation of thermoplastic spew which exits from the ports. This spew is still molten as it issues from the ports and thus is a potential hazard.

Switches of the type described in the above German specification or in the above Paulson patent would be of no use in low pressure moulding. As these prior switches operate only on the substantial pressure increase within a mould cavity, they have no practical application in a low pressure mould operation. Furthermore, the switch described in at least the German specification could not function correctly to ensure complete cavity filling, unless it was disposed in the position of the part of the cavity last to be filled. In certain moulds, both for high and low pressure operation, cavities have shapes which make it impossible to determine the filling pattern for the mould and which part of the mould will invariably fill last.

The present invention provides a method of moulding an article by low pressure moulding, i.e., below 100 lbs./sq. in. in which the entry of molten material into the cavity is automatically terminated upon completion of filling, even though the cavity may be of such a shape that the flow pattern of molten material into the cavity cannot accurately be determined.

According to the present invention there is provided a method of moulding an article comprising causing molten plastics material to flow into a mould cavity at a low pressure and, during filling, causing the material to extend across and bridge an open passage extending from the cavity so that the surface of the material bridging the passage avoids contact with any other surface, and filling of the mould effecting an increase in pressure of the molten material at the passage to force the molten material to flow along the passage to a switch operating location and operate a switch to cease further flow of the material into the mould.

Another problem exists in situations where it is desired to mould encapsulations around crushable or deformable objects. The above method according to the invention may be used to solve the problem of preventing crushing or deformation of an encapsulated object, while ensuring the mould has filled and providing for automatic cutoff for flow of material into the mould.

According to a further aspect of the invention, there is provided a method of moulding an article in the form of an encapsulation around an object which is deformable or crushable under a certain compressive load, said method comprising causing molten plastics material to flow at a low pressure into a mould cavity containing the object and, during filling, causing the material to extend across and bridge an open passage extending from the cavity, and filling the cavity to effect an increase in pressure in the molten material, which pressure is below that required to deform or crush the object and is sufficient at the passage to force the molten material to flow along the passage to a switch operating location and operate a switch to cease further flow of the material into the mould.

The above methods according to the invention may be used successfully for low pressure moulding below maximum mould pressures of 100 lbs./sq. in., this being the maximum pressure required to operate the switch which will stop further flow of molten material into the mould. In fact, maximum pressures may be as low as from 5 to 15 lbs./sq. in.

In the methods according to the invention, it is essential that the passage is open to allow the molten material to flow down it to a switch spaced from the mould cavity. It has been discovered that when molten plastics material contacts mould surfaces within a mould, then it commences to cool and solidify immediately, thereby forming a skin. Skin formation starts while the mould is being filled by low pressure moulding methods, because a complete filling is a process possibly taking several minutes and is particularly slow compared to the almost instantaneous filling of a mould with extremely high injection moulding processes. Further, moulded parts can have a wall thickness over 1.00 inches thick. This accounts for an outer skin on the injected plastic while there is molten inner core material. If a switch is located in such a position that it is lying either at the surface of the mould cavity itself or is disposed along a passage with too large a cross-sectional area, then the switch is contacted by the flow of the molten material during filling of the mould and before final buildup in mould pressure. In this situation, mere contact of the switch by the molten material is sufficient to cause cooling of the material at the position of the switch, thereby forming a substantial skin at this point also. Upon completion of filling of the mould and when the pressure within the mould increases slightly under the continuation of the filling force, it has been found that under these circumstances, the extra force may be insufficient to deform or break the skin and operate the switch. Hence, this method in which the switch is contacted directly during mould filling does not ensure that the flow of molten material will be stopped upon mould filling.

In the method according to the invention however, the molten material will extend across the open passage if this is of a certain cross-sectional area to prevent flow of the material along the passage at the low moulding pressure. The surface tension of the molten material at this low pressure thus successfully resists the flow over the cross-sectional area, which is not supported by and is out of contact with any other surface. This resistance is assisted by resistance to flow created by surface drag of the passage wall in a case where the molten material slightly enters the passage at a low moulding pressure. As the molten material extending across the passage avoids contact with any other surface, e.g. the mould cavity surface, it does not cool as quickly as elsewhere and any skin which may be formed at the bridging position is substantially thinner than at other positions around the mould. Upon the mould becoming filled the slight increase in pressure upon the molten material at the bridging position acts upon this weak skin thickness to cause flow along the passage to operate the switch. It follows that for any particular article being made and taking into account the particular thermoplastics material being used, that the shape of the passage and the position of the switch will need to be determined in each case. For instance, it has been determined that to make an encapsulation for a cable splice by moulding the encapsulation in substantially cylindrical form with approximately 3 inches diameter and a 17 inch length, then this may require a circular passage which may have a diameter of about 3/16ths of an inch, in a case where the molten thermoplastics material is a low density polyethylene and where the maximum mould pressure does not exceed 15 lbs./sq. in. When the orifice size is 3/16 inch as just stated, the switch operating location has been determined to lie at approximately 0.5 inches along the passage from the mould surface. Alternatively, it is being determined that a similar maximum low moulding pressure will enable the methods of the invention to be followed where the passage has a diameter of approximately 0.5 inches and the switch operating location is approximately 0.75 inches from the surface of the mould cavity. In each of these cases just given, the molten material may flow partly into the passage during filling, but further flow towards the switch operating location is prevented by the surface tension in the molten material where it bridges the open passage as assisted by increase in surface drag upon the material as it proceeds along and increases its area of contact with the passage surface.

A main advantage of methods according to the invention for use with low pressure moulding and which will become apparent from the above discussion and from the embodiments discussed below, is that for low operating moulding pressures, it is possible to place the passage and thus the switch in any location relative to the mould cavity, while the method ensures that the switch will be operated by the flow of molten material along the passage only upon the mould becoming completely filled. This is of utmost importance in cases where it is impossible to determine and place an entrance to the passage at the exact final location of the cavity, which is reached by the molten material when the cavity becomes filled.

Embodiments of the invention will now be described by way of example, with reference to the accompanying drawings in which.

Figure 1:
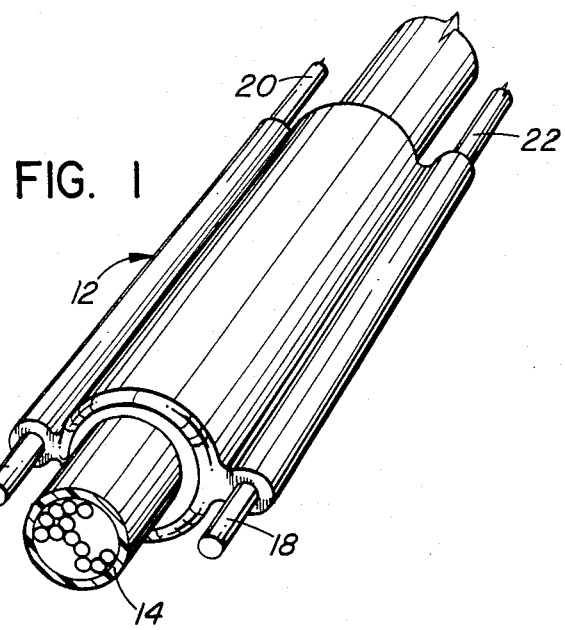
FIG. 1 is an isometric view of an encapsulated splice of four drop wires extending from a main telecommunications cable.
Figure 2:
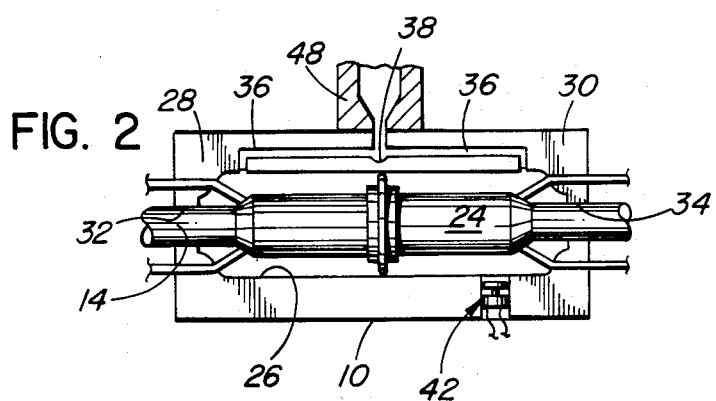
FIG. 2 is a cross-sectional view through a mould during an encapsulation process and according to a first embodiment.
Figures 3, 4:
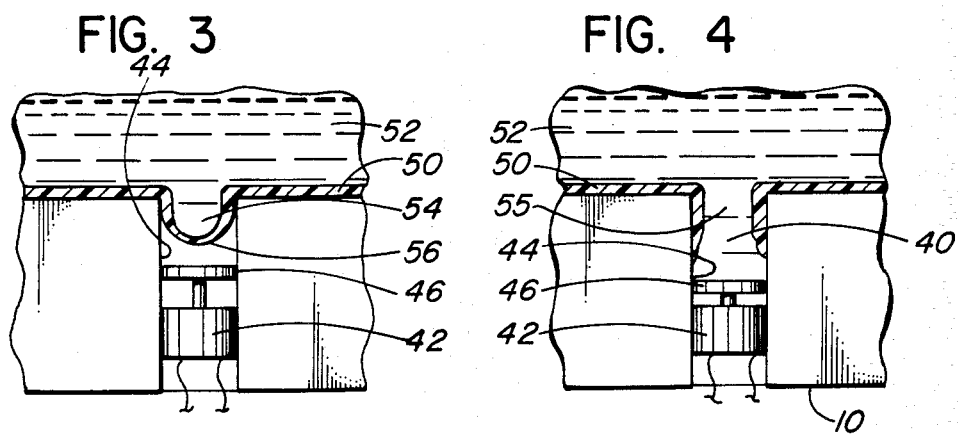
FIG. 3 is a view similar to FIG. 2 of part of the mould on a larger scale and showing the moulding procedure of the encapsulation for the splice partially completed.
FIG. 4 is a view similar to FIG. 3 showing the position of a switch after completion of the moulding process.

In a first embodiment, as shown in FIGS. 2, 3 and 4, a mould 10 is used for the manufacture of an encapsulation 12 (see FIG. 1) for a telecommunications cable 14. The cable has four drop wire pairs 16, 18, 20 and 22 spliced to pairs of conductors of the main cable. For convenience in splicing, the drop wires emerge from the encapsulation 12, axially at each end of the encapsulation, with the wires of each end diametrically offset from one another across the main cable. The encapsulation is constructed and formed in the manner described in copending U.S. patent application Ser. No. 129,246 filed Mar. 11, 1980, now U.S. Pat. No. 4,322,573, entitled "Encapsulation of Telecommunication Cable Splices" and in the name of L. J. Charlebois.

The drop wires are electrically connected to main cable conductors in the manner described in the aforementioned patent application. To encapsulate the splice, the cable with the drop wires connected to it and surrounded in the splice area with a layer 24 of sealing material (FIG. 2) is located within the mould 10 which defines the outer shape of the encapsulation 12 by its mould cavity 26.

In FIG. 2, one mould half 28 of the mould is shown with the cable 14 extending through it with the drop wires in position. The mould half has a planar mould surface 30 for contacting the other mould half. The surface 30 is formed with aligned semi-cylindrical openings 32 and 34 as described in the aforementioned application and also has passages 36 opening adjacent each end of the mould cavity. A central disposed blind passage 38 is provided for accommodating a leading plastics slug from the injection moulding machine during a moulding operation so as to hold it away from the main flow passages in case the slug has not been softened sufficiently for injection purposes.

Should the moulding pressure be above a predetermined upper limit during moulding, then the pressure of the encapsulation in the mould would be sufficient to compress the cable 14 extending into it in such a way as to distort the cable and displace the conductors and the insulation surrounding them. In order to prevent this from happening, a low pressure moulding technique is used and this incorporates a switch means which ensures that the flow of the plastics material into the mould ceases when the mould is full and before pressure in the mould has increased sufficiently to cause distortion. Such a switch means may be designed to operate at any pressure within the mould but, in this particular instance, it is sufficient for the mould pressure to be at a maximum of up to 15 lbs./sq. in. when flow of the material into the mould ceases.

The switch means comprises a pressure or limit switch 42 as shown in FIG. 2. As is more clearly shown by FIGS. 3 and 4, the switch is disposed within a cylindrical passage 44 formed between mating parts of the two mould halves. The pressure switch 42 has an operating plunger 46 extending from the switch towards the mould cavity and is disposed at a position spaced from the mould cavity in its unoperated position as shown in FIG. 3. The position of the plunger 46 and the cross-sectional area of the passage 44 is such that upon filling of the mould with molten plastics material, a certain predetermined pressure is required to force the plastics material from the mould cavity along the passage into a position in which it will operate the switch 42. This position, which is referred to as the switch operating location, is when the plastics material engages the plunger 46 and forces it under the moulding pressure towards the switch body. A load which may be of the order of 1 and 3 lbs. upon the plunger 46 corresponds to a pressure within the mould cavity of between 5 and 15 lbs./sq. in. depending on the plunger diameter. It should be realized that this is the pressure limitation which is imposed upon this particular encapsulation in this embodiment. However, for different applications, a different predetermined pressure may be desirable. The pressure in any instance does depend, of course, upon the viscosity of the molten material at its moulding temperature and also upon the size of the passage 44 and the location of the plunger within the passage. In the present embodiment, to obtain a final moulding pressure of up to 8 lbs./sq. in., the diameter of the passage 44 is approximately 0.75" and the position of the plunger 46 is 0.5" from the surface of the mould cavity. The spring load on the plunger is 3.5 pounds. This is for use with a low density polyethylene which may have a melt index of 46 such as Dupont Product No. 2114 which has a melt extrusion temperature into the mould of approximately 340° F. Alternatively, a low density polyethylene manufactured by Dow Chemical of Canada Limited under its Product No. 955 and having a melt index of 28 may be used as the encapsulation material at a melt extrusion temperature of 340° F. As will be seen, a passage with a cross-sectional area of 0.5" with the plastics material discussed, is sufficiently small to prevent the molten material from passing from it to operate the switch until the mould is completely filled.

In use of the mould, the cable 10 and the drop wires 14, with their sealing material 24, are located within the mould cavity so as to occupy the position shown in FIG. 2. The low density molten polyethylene is then extruded, by an extruder 48, and at around a moulding pressure of 1 to 3 lbs./sq. in., into the mould cavity so as to fill it. As the mould is being filled, the molten material flows across and bridges the entrance to the passage 44 and at the low moulding pressures, the surface tension of the material prevents flow along the passage to the switch. The polyethylene may extend partially into the passage 44 as shown in FIG. 3 in which case surface drag of the passage surface upon the molten material assists in preventing further movement along the passage at the low moulding pressures. As may be seen from FIG. 3, upon the molten material contacting the cooler surfaces of the mould halves, a skin 50 begins to form around the molten material. This skin is shown diagrammatically in cross-section in FIG. 3 to differentiate it from the molten polyethylene material 52 which it surrounds. Any part of the polyethylene material which is not contacted by a cooler mould surface is not subjected to the same degree of cooling as the remainder. Thus a plug 54 of the polyethylene material which extends partially along the passage 44 has an end or bridge portion 56 which does not contact the mould parts and skin formed at the end 56 is substantially thinner than at other parts of the encapsulation which are directly in contact with the mould surface. The skin at the end 56 is weak structurally and upon the mould becoming completely full of the encapsulating polyethylene material 52, a slight increase in pressure by the extruder which raises the pressure within the cavity towards 8 lbs./sq. in. is sufficient to rupture this thin skin. Hence, immediately after filling of the mould, extra polyethylene material 55 is forced further into the passage 44 until it reaches the switch operating location. In this position it applies a load just exceeding 3.5 lbs. to the plunger and forces the plunger towards the body of the switch as shown in FIG. 4, thereby operating the switch. The switch is itself connected electrically to drive means for the extruder and upon switch operation by movement of plunger 46, it operates to de-energize the drive means. Hence, the extrusion of the polyethylene into the mould cavity ceases immediately the plunger 46 has been operated.

As may be seen in the above described embodiment, the position of the switch 42 with its plunger removed from the mould cavity along the passage 44 acts to control the maximum pressure which may be applied within the mould. Upon attainment of this pressure, i.e. by operation of the plunger, extrusion of the material into the mould cavity ceases whereby the pressure does not increase to a degree comparable to that with a high pressure injection moulding process. Hence the crushable article, i.e. the cable 14, is not subjected to sufficient compressive load to distort it.

It should be stressed that the switch, because of its position, is able to control the inner core pressure of the plastic and not the outer cooled skin pressure. Inner core pressure cannot be accurately monitored in low pressure moulding by use of existing technology.

It is worthy of note that with the mould described according to the first embodiment, there is no overflow of molten material from the mould and no operator mould stopping requirement is necessary. A further disadvantage is that there is no sprue of material issuing from the mould as is normally the case with a low pressure moulding technique. In the finished product the quality of the encapsulation is entirely suitable for its purposes which does not require a high degree of surface finish. Also, the plug of material 40 which forms along the passage 44 as shown in FIG. 4 is easily removed from the mould during extraction of the finished encapsulation as the passage 44 is formed upon the split line between the two mould halves. Such a location of the passage is not in fact essential as it may be located completely within one mould half so long as care is taken to allow for removal of the plug 40 along the passage. In instances where the molten plastic is injected into the mould cavity by means of a hand gun or accumulator, a similar switch may be used to accurately control the pressure using a visual mechanical rod protruding from the back of the switch.

It has been shown in practice that switch means in a mould according to the invention and as shown in the first embodiment, operates consistently and without failure, i.e. without failure to stop extrusion of the molten material in to the mould cavity when the cavity is filled and when the pressure is between 5 and 15 lbs./sq. in. Hence the invention has practical significance.

All of these advantages are obtainable in mould cavity shapes in which the flow pattern into the mould cannot be determined and may not be the same from one moulding operation to another. Hence, the last part of the cavity to be filled cannot be known. Such is the case in this embodiment where the presence of the cable upsets any flow patterns into the cavity. The passage location and its entrance position into the cavity is unimportant as resistance to flow and allowing the flow of molten material down the passage are both governed by the cross-sectional area of the passage across which the molten material extends, surface tension of the material, surface drag of the passage and resistance to bursting of the skin. Thus the passage may be bridged at any time during mould filling and before filling is actually completed.

Further, during low pressure moulding of thick sections such as in this embodiment, the core of the moulded part or encapsulation may remain molten for 10 minutes when the moulding is up top 1.00 inch thick or greater. In this embodiment, the depth through the encapsulation to the cable is at least 1.00 inch. Conventional pressure monitors indicate pressure at the surface of the moulded article. While this is adequate for most injection moulded articles, it is not sufficient for thick wall sections that cool slowly. However, in the method of the present invention, the inside pressure of the moulded part is both monitored and limited, because at the final pressure attained upon filling, this pressure ruptures the skin to operate the switch.

Figure 5:
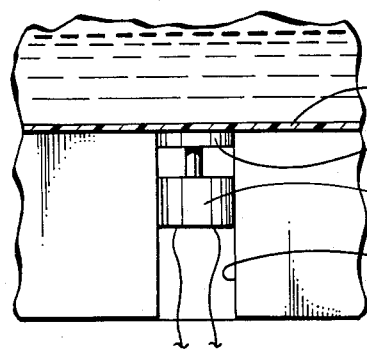
FIG. 5 is a view similar to FIG. 3 of a construction not according to the invention and with the switch located immediately adjacent the mould cavity.

In contrast to this, it has been shown that if the switch 42 is replaced by a switch 42a located in an incorrect position such as in FIG. 5, then the switch has a tendency not to operate in the required manner. The reason for this is as follows. In the structure shown in FIG. 5, which of course is not according to the invention, the switch 42a is disposed in passage 44a with its plunger 46a substantially level with the mould surface. In use of the mould shown by FIG. 5, the molten encapsulation material upon being injected into the mould contacts not only the mould surface but also the plunger 46a. During the filling stage, the pressure of the molten material would be insufficient for it to press the plunger 46a downwards into the passage 44a to operate the switch 42a. Thus during filling of the mould cavity the plunger 46a would be retained in the position shown in FIG. 5 and any skin 50a forming by contact with the mould parts would also form upon contact with the plunger 46a. As the plunger at this stage would have a temperature substantially equal to that of the mould parts, then the skin 50a would be of substantially uniform thickness throughout, i.e. across the plunger 46a and in contact with the mould surfaces. Upon completion of the filling of the mould, the skin in contact with the plunger 46a would be substantially thicker than that at the end of the plug 56 as shown in the first embodiment. Upon buildup in pressure within the mould, it has been found that the skin extending across the plunger 46a has sufficient strength to withstand the pressure increase whereby no plug is formed into the passage 44a and the switch 42a is not operated. In such a situation, without the use of conventional exit ports for sprue, the pressure within the mould builds up in uncontrollable fashion and compresses the cable so as to distort it while also forcing open the mould. Clearly, therefore, such an arrangement as shown by FIG. 5 does not overcome the problems of moulding at low pressure conditions as is found in the use of the mould according to the invention and as described in the first embodiment.

In second and third embodiments now to be described, the same advantages are obtained as are obtained with the first embodiment.

Figure 6:
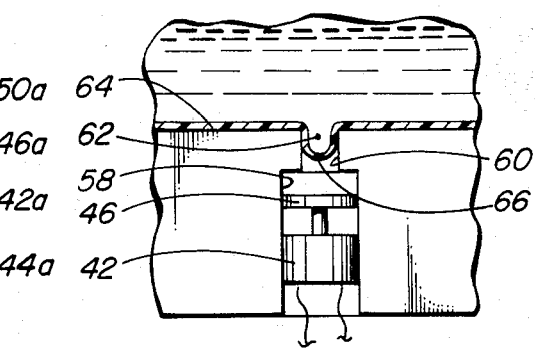
FIG. 6 is a view similar to FIG. 3 of a second embodiment.

In a second embodiment, as shown in FIG. 6, the mould is substantially as described for FIG. 2 and has a switch means also comprising a pressure switch 42 with plunger 46 as described in the first embodiment. The switch is disposed within a passage 58 which is approximately 0.5" in diameter for most of its length and has a neck 60 which opens into the mould cavity, the neck being approximately 3/16" in diameter. The neck extends for approximately 0.25" from the mould cavity to the larger diameter part of the passage 58. With this shape of passage, i.e. at the neck, a greater resistance is offered by the passage to the movement of a plug of material along the passage than is offered in the case of the first embodiment where the passage opens with a diameter of 0.5" into the mould cavity. With the structure shown in FIG. 6, it has been determined that the switch operating position may be closer to the mould cavity than in the first embodiment and in this particular case the plunger 46 is disposed at approximately 0.5" away from the mould cavity instead of 0.75" as in the first embodiment.

Figure 7:
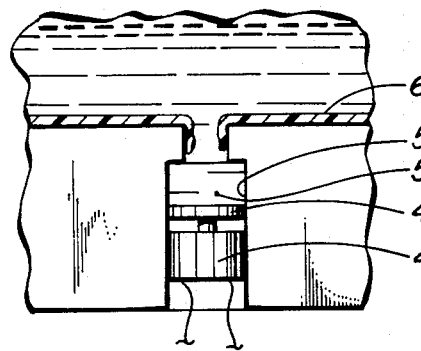
FIG. 7 is a view similar to FIG. 4 of the second embodiment.

In use, the filling of the mould is substantially as described in the first embodiment. Upon filling of the mould, a plug 62 of plastics material extends into the neck 60 of the passage. A skin 64 which is formed around the molten material is substantially of constant thickness except for a thinner skin portion 66 at the end of the plug extending into the neck and bridging the passage. Upon the attainment of a pressure up to 15 lbs./sq. in. in the mould after filling of the mould cavity, the molten material is forced through the skin portion 66 so as to pass along the passage 58, as at 59, and into contact with the plunger 46 to press the plunger and operate the switch 42. The extrusion device is then switched off as in a first embodiment. This situation is shown by FIG. 7.

Figure 8:
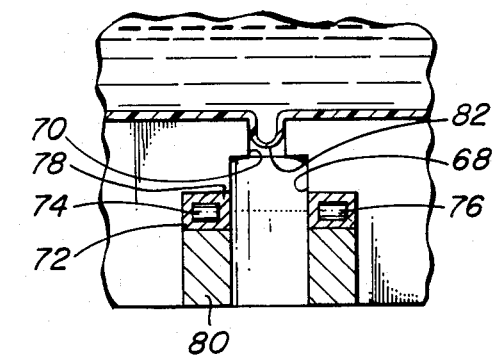
FIG. 8 is a view similar to FIG. 3 of a third embodiment.
Figure 9:
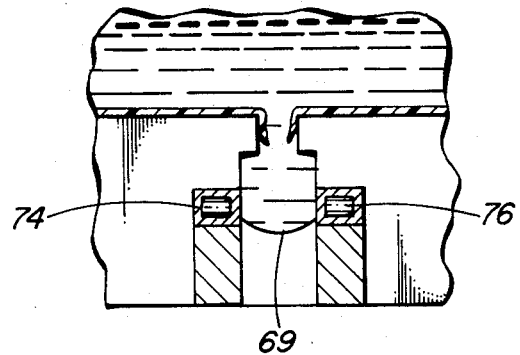
FIG. 9 is a view similar to FIG. 4 of the third embodiment.

In a third embodiment shown by FIG. 8, a mould has a passage 68 of substantially the same shape and size as described in the second embodiment, i.e. with a neck 70. In this embodiment, the switch means comprises an optical switch 72 which is in the form of a light transmitter 74 and receiver 76 disposed on opposite sides of the passage 68 in the switch operating location so as to transmit and receive signals across the passage. The transmitter/receiver are imbedded in block 78 of a material which resists heat transfer from the molten material whereby the transmitter and receiver are protected from damage caused by the heat. Such a material is a polycarbonate which allows for the transmittance of the signal. The switch means 72 is held in position by a plug 80 which may be screwed into the mould part or attached by other means.

In use of the mould of the third embodiment, the mould is filled in the manner described in the first embodiment and, upon filling, a plug is formed extending partly into the neck 70. As described with regard to the second embodiment, a layer of skin 82 at the end of the plug is thinner than at other parts of the moulded encapsulation. Upon the mould filling, the pressure within the mould cavity increases until the skin 82 becomes ruptured by the molten material which then flows down the passage 68 to the switch operating location as at 69 at which it lies between the transmitter and receiver 74, 76. Upon reaching this location, the signal is no longer received by the photocell and this results in the operating means for the extruder being immediately de-energized. Hence the mould pressure does not exceed 15 lbs/sq. in. after filling and thus no distortion of the cable or the sealing material surrounding it can result.

What is claimed is:

1. A method of moulding an article in the form of an encapsulation around an object which is deformable or crushable under a certain compressive load, comprising causing molten plastics material to flow at a low pressure into a mould cavity containing the object and, during filling, causing the material to extend across and bridge an open passage extending from the cavity and permitting the commencement of formation of a skin on the material bridging the passage, said skin being thinner than skin contacting surfaces of the mould, and filling the cavity to effect an increase in pressure in the molten material, which pressure is below that required to deform or crush the object but is sufficient to cause rupture of said thinner skin and to force a flow of the molten material along the passage to a switch operating location and operate a switch to cease futher flow of material into the mould.

* * * * *